(12) United States Patent
Chang et al.

(10) Patent No.: US 7,609,344 B2
(45) Date of Patent: Oct. 27, 2009

(54) TRANSFLECTIVE LIQUID CRYSTAL DISPLAY AND MANUFACTURING METHOD THEREOF

(75) Inventors: Young-Joo Chang, Gyeonggi-do (KR); Jae-Ik Lim, Gangwon-do (KR); Jae-Young Lee, Seoul (KR); Seung-Kyu Lee, Gyeonggi-do (KR); Sung-Eun Cha, Gyeongsangnam-do (KR); Poundaleva Irina, Gyeonggi-do (KR); Sang-Woo Kim, Gyeonggi-do (KR); Jae-Hyun Kim, Gyeonggi-do (KR); Hae-Young Yun, Gyeonggi-do (KR); Won-Sang Park, Gyeonggi-do (KR); Kee-Han Uh, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 471 days.

(21) Appl. No.: 11/301,863

(22) Filed: Dec. 12, 2005

(65) Prior Publication Data

US 2006/0125987 A1 Jun. 15, 2006

(30) Foreign Application Priority Data

Dec. 14, 2004 (KR) ................. 10-2004-0105546
Dec. 15, 2004 (KR) ................. 10-2004-0106073

(51) Int. Cl.
*G02F 1/1335* (2006.01)
(52) U.S. Cl. ..................... 349/114; 349/106
(58) Field of Classification Search ............. 349/106, 349/114
See application file for complete search history.

(56) References Cited

U.S. PATENT DOCUMENTS

| | | | | |
|---|---|---|---|---|
| 6,108,064 A * | 8/2000 | Minoura et al. | ............ | 349/130 |
| 6,339,462 B1 * | 1/2002 | Kishimoto et al. | ......... | 349/156 |
| 6,785,068 B2 * | 8/2004 | Takizawa et al. | ............ | 359/885 |
| 6,819,379 B2 * | 11/2004 | Kubo et al. | ................. | 349/114 |
| 6,850,297 B2 * | 2/2005 | Takizawa et al. | ............ | 349/114 |
| 7,088,407 B2 * | 8/2006 | Takizawa et al. | ............ | 349/114 |
| 7,102,716 B2 * | 9/2006 | Lee et al. | .................... | 349/114 |
| 7,176,996 B2 * | 2/2007 | Soo-Guy | .................... | 349/114 |
| 7,352,420 B2 * | 4/2008 | Maeda et al. | ............... | 349/114 |
| 2002/0113927 A1 * | 8/2002 | Ha et al. | .................... | 349/113 |
| 2002/0171794 A1 | 11/2002 | Nakamura et al. | | |

FOREIGN PATENT DOCUMENTS

| | | |
|---|---|---|
| CN | 1392960 A | 1/2003 |
| CN | 1438529 A | 8/2003 |
| CN | 2590028 Y | 12/2003 |
| CN | 1475841 A | 2/2004 |
| JP | 08166585 | 6/1996 |
| JP | 2000267081 | 9/2000 |

(Continued)

*Primary Examiner*—Julie Ngo
(74) *Attorney, Agent, or Firm*—Cantor Colburn LLP

(57) ABSTRACT

The present invention provides a transflective liquid crystal display having reflection regions and transmission regions, including a first substrate, a light transmissive layer formed on the first substrate and having recessed portions corresponding to the transmission regions, color filters formed on the light transmissive layer and having a position-dependent thickness due to the recessed portions of the light transmissive layer, transparent electrodes formed on the first substrate, reflective electrodes disposed on the reflection regions and interposed between the light transmissive layer and the color filters, a second substrate, a common electrode formed on the second substrate, and a liquid crystal layer interposed between the first substrate and the second substrate.

20 Claims, 16 Drawing Sheets

FOREIGN PATENT DOCUMENTS

| | | |
|---|---|---|
| JP | 2002268054 | 9/2002 |
| JP | 2003066473 | 3/2003 |
| JP | 2003279959 | 10/2003 |
| JP | 2003279962 | 10/2003 |
| JP | 2003323124 | 11/2003 |
| KR | 1020020010747 | 2/2002 |
| KR | 1020020037493 | 5/2002 |
| KR | 20020056959 | 7/2002 |
| KR | 1020020068765 | 8/2002 |
| KR | 20030019305 | 3/2003 |
| KR | 1020040074605 | 8/2004 |
| WO | 0070399 | 11/2000 |

\* cited by examiner

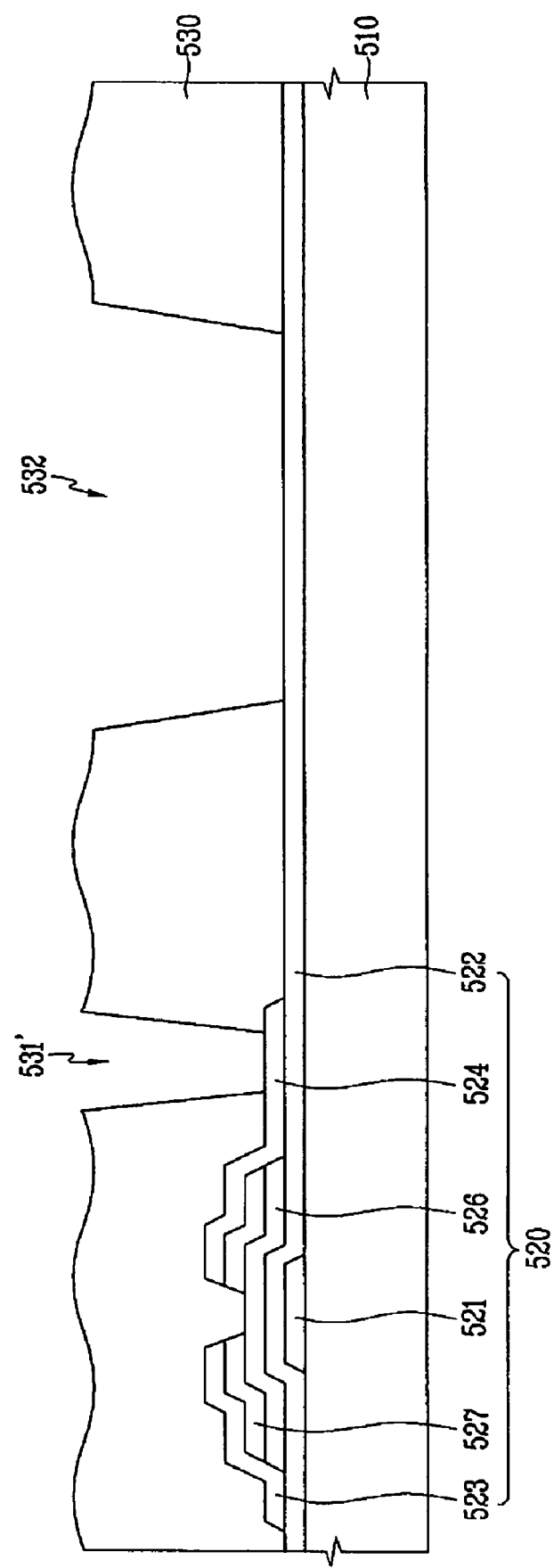

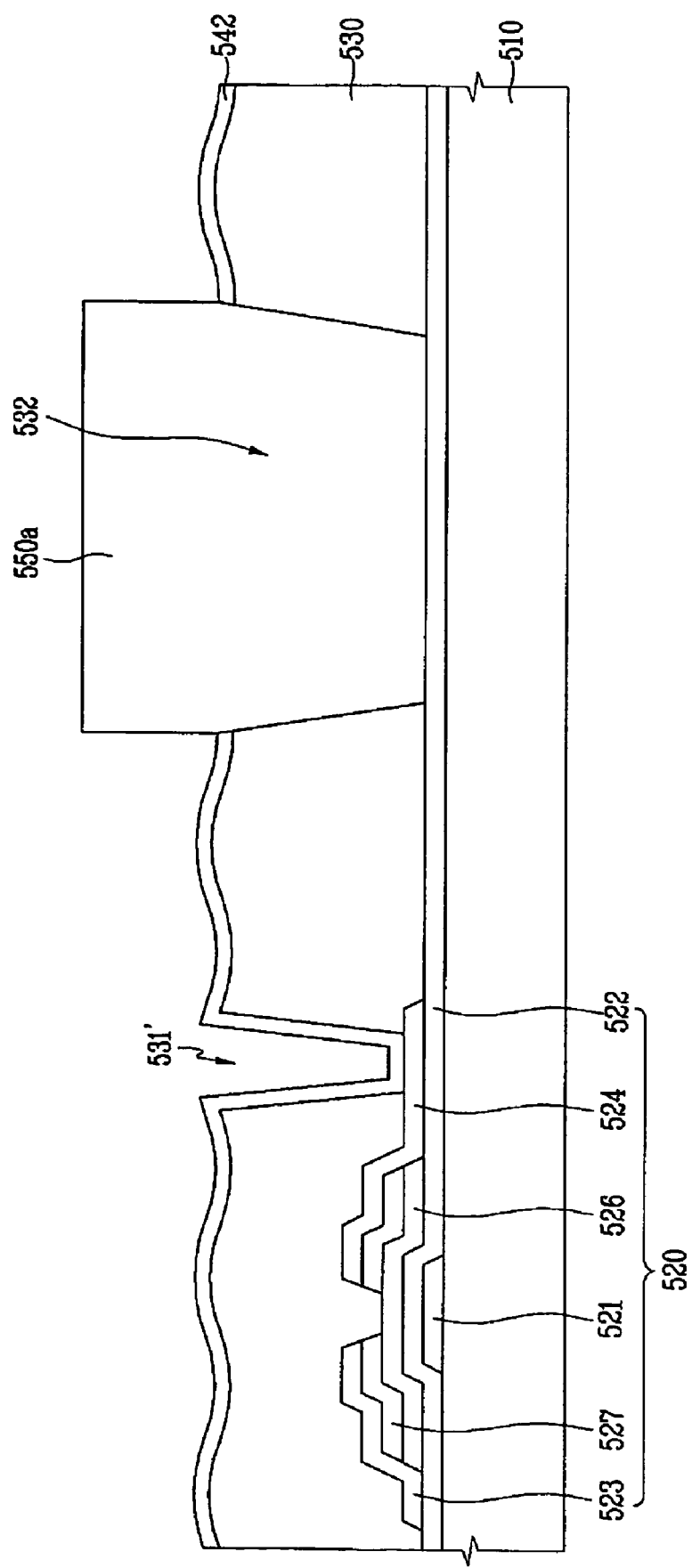

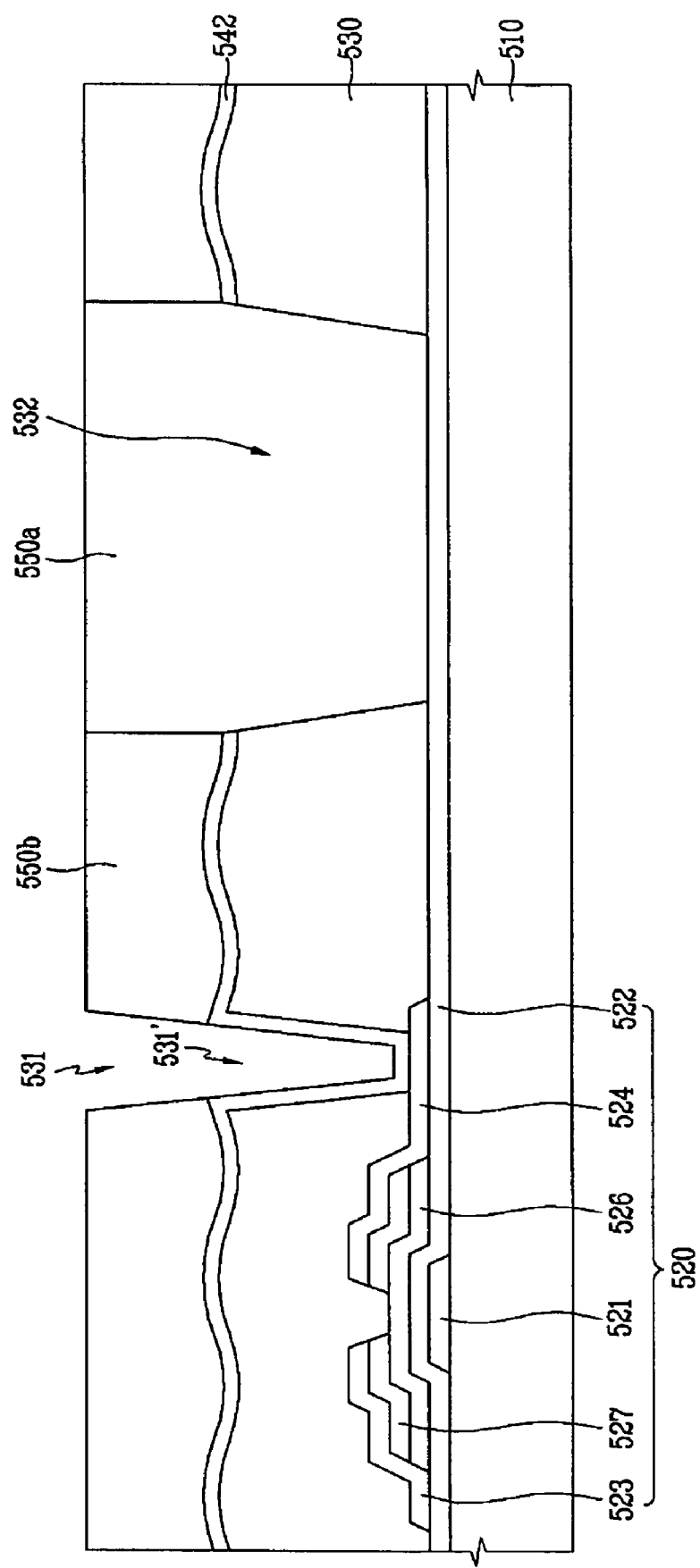

TRANSFLECTIVE LIQUID CRYSTAL DISPLAY AND MANUFACTURING METHOD THEREOF

BACKGROUND OF THE INVENTION (a) Field of the Invention

The present disclosure relates to a transflective liquid crystal display (LCD) and a manufacturing method thereof.

(b) Description of Related Art

LCDs are classified into a transmissive LCD and a reflective LCD according to the light source. The transmissive LCD has a backlight as the light source, while the reflective LCD uses external light as the light source.

A transflective LCD which uses both a backlight and external light as the light source is also under development. The transflective LCD has merits of both the transmissive LCD and the reflective LCD. The merits of the reflective LCD are low power consumption and good visibility in a bright environment, and merits of the transmissive LCD are good visibility in a dark environment such as an indoor situation. Accordingly, the transflective LCD can be used regardless of brightness of the environment, and is useful for a mobile display due to its low power consumption.

FIG. 1 is a sectional view of a conventional transflective LCD.

Referring to FIG. 1, a conventional transflective LCD 100 has a thin film transistor (TFT) array panel 160 having a plurality of TFTs, a color filter array panel 170 facing the TFT array panel 160 and having a plurality of color filters 150 and a common electrode 173, and a liquid crystal layer 180 interposed between the two panels 160 and 170.

The TFT array panel 160 has a first insulating substrate 110, a plurality of TFTs 120, a plurality of pixel electrodes 140 composed of transparent electrodes 141 and reflective electrodes 142 and connected to the TFTs 120, and an organic insulating layer 130 interposed between the TFTs 120 and the pixel electrodes 140. Each TFT 120 includes a gate electrode 121, a source electrode 123 and a drain electrode 124.

The area of each pixel electrode 140 is classified as a reflection region B where the reflective electrode 142 is disposed, and a transmission region A where the transparent electrode 141 is disposed.

The color filter array panel 170 has a second insulating substrate 171, a plurality of color filters 150 formed on the second substrate 171, and a common electrode 173 covering the color filters 150.

Such a transflective LCD has two different modes of operation: a transmission mode and a reflection mode. In the reflection mode, images are displayed by using external light L1 that is introduced through the color filter array panel 170 and is reflected back at the reflective electrode 142. In the transmission mode, images are displayed by using a back light (L2) that comes from a back light unit disposed on the back side of the TFT array panel 160 and passes out of the TFT array panel 160, the liquid crystal layer 180, and the color filter array panel 170.

In the reflection mode, the external light L1 passes through the color filter 150 twice to display an image, but in the transmission mode, the back light L2 passes through the color filter 150 just once to display an image. Accordingly, a difference in color reproduction is induced between the two modes.

Furthermore, in the reflection mode, the external light (L1) passes through the liquid crystal layer 180 twice so the length of light passage in the liquid crystal layer 180 is 2d. However, in the transmission mode, the back light L2 passes through the liquid crystal layer 180 just once so the length of light passage in the liquid crystal layer 180 is d. Such a difference of light passage length induces a difference of optical characteristics between the two modes.

SUMMARY OF THE INVENTION

The present invention provides a transflective LCD having minimal discrepancy in color reproduction between the transmission mode and the reflection mode, and a manufacturing method of the same.

The present invention provides a transflective LCD having minimal discrepancy in optical characteristics between the transmission mode and the reflection mode, and a manufacturing method of the same.

In detail, the present invention provides a transflective liquid crystal display having reflection regions and transmission regions and comprising a first substrate, a light transmissive layer formed on the first substrate and having recessed portions corresponding to the transmission regions, color filters formed on the light transmissive layer and having a position-dependent thickness due to the recessed portions of the light transmissive layer, transparent electrodes formed on the first substrate, reflective electrodes disposed on the reflection regions and interposed between the light transmissive layer and the color filters, a second substrate, a common electrode formed on the second substrate, and a liquid crystal layer interposed between the first substrate and the second substrate.

The transflective liquid crystal display may further comprise TFTs having gate electrodes formed on the first substrate, semiconductors formed on or under the gate electrodes and insulated from the gate electrodes, source and drain electrodes connected to the semiconductors, and pixel electrodes connected to the drain electrodes.

The transflective liquid crystal display may further comprise an insulating layer interposed between the second substrate and the common electrode, and having recessed portions facing the recessed portions of the light transmissive layer.

The recessed portions of the light transmissive layer may have a depth substantially the same as the thickness of the color filter on the reflection regions, and the thickness of the light transmissive layer at the recessed portions may be zero. The light transmissive layer may have an embossed surface and the reflective electrodes may have an embossed structure due to the embossed surface of the light transmissive layer.

The color filters may have a substantially flat top surface. The thickness of the color filters on the transmission region may be twice that on the reflection regions.

The transparent electrodes may be interposed between the light transmissive layer and the reflective electrodes, between the first substrate and the light transmissive layer, or they may be may be disposed on the color filters.

The liquid crystal layer may have liquid crystals aligned parallel to the first and second substrates and in the same direction when no electric field is applied.

The transflective liquid crystal display may further comprise a first alignment layer formed on the color filters and a second alignment layer formed on the common electrode, wherein the rubbing direction of the first alignment layer is parallel with that of the second alignment layer.

The liquid crystal layer may have liquid crystals aligned vertical to the first and second substrates when no electric field is applied.

The present invention provides a manufacturing method of a transflective liquid crystal display, comprising forming TFTs on a first substrate, forming a light transmissive layer having recessed portions on the first substrate where the TFTs are formed, forming reflective electrodes to have openings corresponding to the recessed portions on the light transmissive layer, forming color filters on the reflective electrodes and the light transmissive layer, forming transparent electrodes on the color filters, forming an insulating layer on a second substrate, forming a common electrode on the insulating layer, assembling the first substrate and the second substrate, and interposing a liquid crystal layer between the first substrate and the second substrate.

The method may further comprise forming an embossed structure at the top surface of the light transmissive layer by exposure through a pattern mask having a slit pattern.

The method may further comprise patterning the insulating layer to have recessed portions corresponding to the recessed portions of the light transmissive layer.

The present invention provides a manufacturing method of a transflective liquid crystal display, comprising forming TFTs on a first substrate, forming a light transmissive layer having recessed portions on the first substrate where the TFTs are formed, forming transparent electrodes on the light transmissive layer, forming reflective electrodes to have openings corresponding to the recessed portions on the transparent electrodes, forming color filters on the reflective electrodes and the transparent electrodes, forming an insulating layer on a second substrate, forming a common electrode on the insulating layer, assembling the first substrate and the second substrate, and interposing a liquid crystal layer between the first substrate and the second substrate.

The present invention provides a manufacturing method of a transflective liquid crystal display, comprising, forming TFTs on a first substrate, forming transparent electrodes on a predetermined regions of the first substrate, forming a light transmissive layer having recessed portions corresponding to the transparent electrodes, forming reflective electrodes to have openings corresponding to the recessed portions on the light transmissive layer, forming color filters on the reflective electrodes and the transparent electrodes, forming an insulating layer on a second substrate, forming a common electrode on the insulating layer, assembling the first substrate and the second substrate, and interposing a liquid crystal layer between the first substrate and the second substrate.

The formation of color filters may comprise transferring a color filter layer of a transfer film on the reflective electrodes and the light transmissive layer and patterning the transferred color filter layer.

The formation of color filters may comprise transferring a first color filter layer of a first transfer film on the reflective electrodes and the light transmissive layer; patterning the first color filter layer to form a first color filter filling the recessed portions of the light transmissive layer; transferring a second color filter layer of a second transfer film on the reflective electrodes and the light transmissive layer; and patterning the second color filter layer to form a second color filter disposed on the reflective electrode.

The transfers of the first and second color filter layer may be performed by pressing with a roller.

The first substrate may be heated to a temperature of 100~110° C. and the roller may be heated to a temperature of 120~140° C. during the transfers are performed.

BRIEF DESCRIPTION OF THE DRAWINGS

Preferred embodiments of the present invention can be understood in more detail from the following descriptions taken in conjunction with the accompanying drawings, in which:

FIGS. 5A to 5F are sectional views of a TFT array panel for the transflective LCD according to an embodiment of the present invention in intermediate steps of manufacturing the TFT array panel;

FIGS. 9A and 9B are sectional views of a TFT array panel for the transflective LCD according to another embodiment of the present invention in intermediate steps of manufacturing the TFT array panel.

DETAILED DESCRIPTION OF EMBODIMENTS

Figure 1:
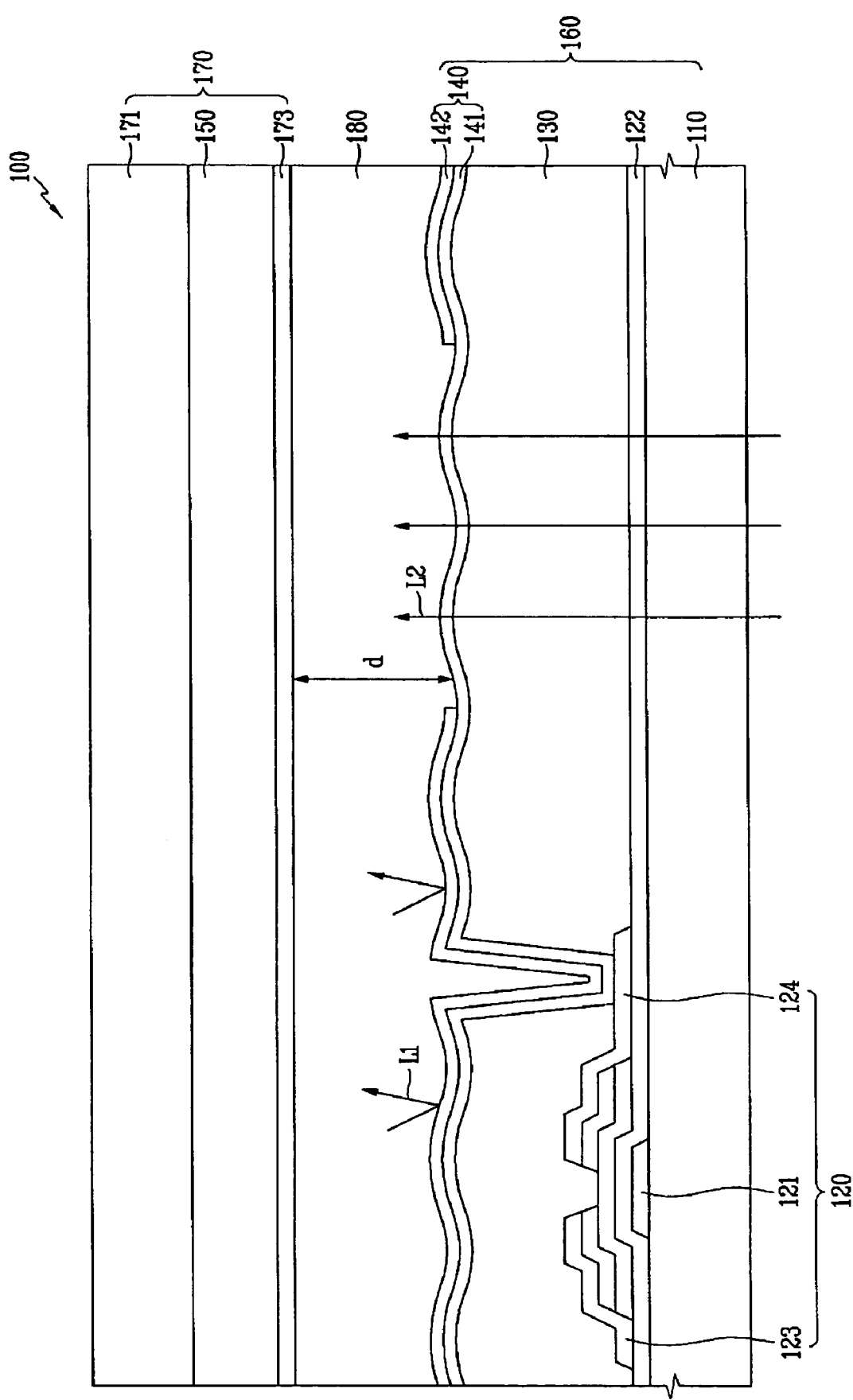
FIG. 1 is a sectional view of a conventional transflective LCD.

Preferred embodiments of the present invention will now be described more fully hereinafter with reference to the accompanying drawings, in which preferred embodiments of the invention are shown. The present invention may, however, be embodied in different forms and should not be construed as being limited to the embodiments set forth herein. Rather, these embodiments are provided so that this disclosure will be thorough and complete, and will fully convey the scope of the invention to those skilled in the art.

In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

Figure 2:
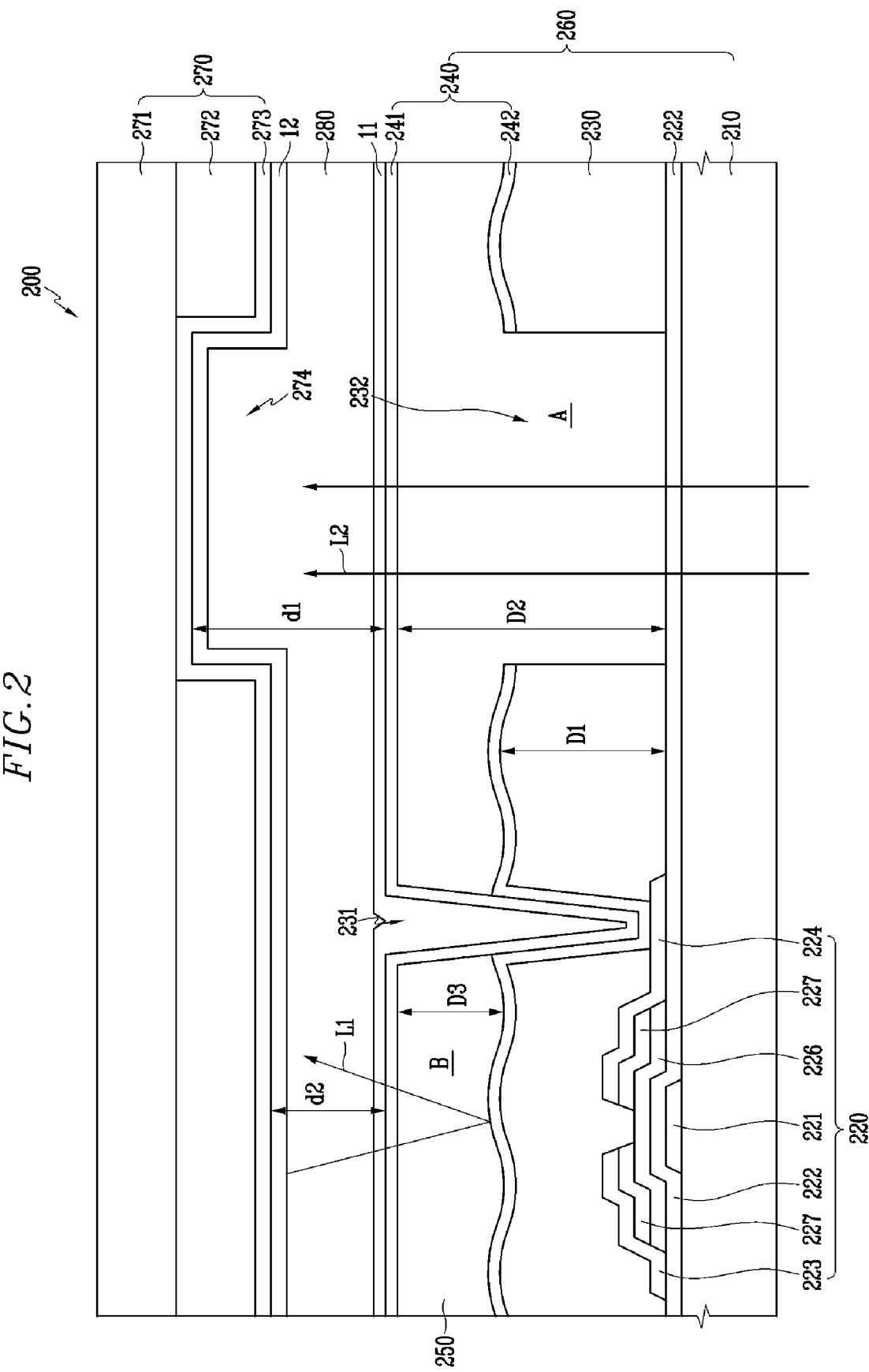
FIG. 2 is a sectional view of a transflective LCD according to an embodiment of the present invention.

FIG. 2 is a sectional view of a transflective LCD according to an embodiment of the present invention.

Referring to FIG. 2, a transflective LCD 200 according to an embodiment of the present invention has a TFT array panel 260, a common electrode panel 270 facing the TFT array panel 260, and a liquid crystal layer 280 interposed between the two panels 260 and 270.

The TFT array panel 260 has a first insulating substrate 210 made of an insulating material such as glass, quartz, or sapphire, a plurality of TFTs 220 formed on the insulating substrate 210, a light transmissive layer 230, and color filters 250.

Each TFT 220 has a gate electrode 221, a gate insulating layer 222, a semiconductor layer 226, a source electrode 223, and a drain electrode 224. FIG. 2 illustrates a bottom gate type of TFT 220 where the gate insulating layer 222 and the semiconductor layer 226 are sequentially formed on the gate electrode. However, a top gate type of TFT where a gate insulating layer and a gate electrode are sequentially formed on the semiconductor layer may also be applied. The semiconductor layer 226 may be made of amorphous silicon or polysilicon.

The light transmissive layer 230 is formed on the TFTs 220 by a method such as spin coating and is made of an insulating material. The light transmissive layer 230 is made of a photosensitive organic material containing such as bisbenzocyclobutene (BCB) or perfluorocyclobutene (PFCB), or a photosensitive inorganic material containing such as silicon oxide ($SiO_2$) or silicon nitride (SiNx). The light transmissive layer 230 has contact holes 231 exposing the drain electrodes 224 and transmission windows 232 through which light from the back light L2 passes. The gate insulating layer 222 is exposed though the transmission windows 232. Steps D1 are formed between the transmission windows 232 and remaining portion of the light transmissive layer 230. The transmission window 232 may be formed by partial removal of the light transmissive layer 230. The light transmissive layer 230 has an embossed surface, but it may have a substantially flat surface.

A plurality of reflective electrodes 242 are formed on the light transmissive layer 230. The reflective electrodes 242 is not disposed on the region of the transmission windows 232, so the regions where the transmission windows 232 are disposed form transmission regions A and the regions where the reflective electrodes 242 are disposed form reflection regions B. The reflective electrodes 242 are made of a metal having high reflectance, such as Al, Ag, an Al—Cu alloy, or an Al—Si—Cu alloy. The reflective electrodes 242 are formed to have a uniform thickness and have the same surface structure as the light transmissive layer 230. Accordingly, when the light transmissive layer 242 has an embossed surface, the reflective electrodes 242 also have embossed surfaces. The embossed surfaces of the reflective electrodes 242 enhance reflection characteristics of external light L1.

The color filters 250 are disposed on the reflective electrode 242 and the region where the transmission windows 232 are formed. When the color filters 250 are disposed on the TFT array panel 260, misalignment between the color filters 250 and pixel electrodes 240 is diminished compared with the conventional transflective LCD. Furthermore, since the color filters 250 having flat surfaces are disposed on the reflective electrodes 242, calculation of cell gap in the reflection regions B is simple. When the reflective electrodes 242 are disposed as a top layer, calculation of cell gap is very complex due to the embossed structure of the reflective electrodes 242.

The color filters 250 have top surfaces with a uniform height. Accordingly, the thickness D2 of the color filters 250 on the transmission regions A is thicker than the thickness D3 of the reflection regions B due to the steps D1 formed by the light transmissive layer 230. As a result, a difference in color reproduction between the transmission regions A and the reflection regions B decreases. It is preferable that the color filters 250 on the transmission regions A have a thickness twice that on the reflection region B to make the length the light passes in the color filters 250 on the transmission regions A substantially equal to that on the reflection region B. Thickness of the color filters 250 may be varied depending on colors.

A plurality of transparent electrodes 241 are formed on the color filters 250. The transparent electrodes 241 are made of a transparent conductive material such as indium tin oxide (ITO) or indium zinc oxide (IZO). The transparent electrodes 241 are electrically connected to the drain electrodes 224 and the reflective electrodes 242 through contact holes 231 formed in the light transmissive layer 230 and the color filters 250. In this embodiment, when the transparent electrodes 241 are formed on the color filters 250, a contact area between the reflective electrodes 242 and the transparent electrodes 241 decreases and thereby the galvanic effect is reduced.

The common electrode panel 270 has a second insulating substrate 271 made of an insulating material such as glass, quartz or sapphire, an overcoating layer 272 formed on the second insulating substrate 271 and formed with a photosensitive material, and a common electrode 273 made of a light transmissive material.

The portions of the overcoating layer 272 facing the transmission windows 232 are removed to form recessed portions 274. Cell gap d1 of the transmission region A is larger than cell gap d2 of the reflection regions B due to the step formed by the recessed portion 274 of the overcoating layer 272. Accordingly, pass length of the external light L1 experienced in the liquid crystal layer 280 on the reflection regions B can be controlled to be the same as that of the back light L2 on the transmission regions A. As a result, a difference of optical characteristics between the reflection mode and the transmission mode is reduced. The depth of the recesses 274 of the overcoating layer 272 are preferably determined in order that the cell gap d1 of the transmission region A is twice as large as the cell gap d2 of the reflection regions B.

The liquid crystal layer 280 is interposed between the TFT array panel 260 and the common electrode panel 270. Liquid crystals in the liquid crystal layer 280 may be aligned in a twisted nematic (TN) mode where liquid crystals are aligned to be parallel to the substrates 210 and 271 and to be twisted when no electric field is applied, or in a vertically aligned (VA) mode where liquid crystals are aligned to be vertical to the substrates 210 and 271 when no electric field is applied. In another way, liquid crystals in the liquid crystal layer 280 may be aligned in an electrically controlled birefringence (ECB) mode where liquid crystals are aligned to be parallel to the substrates 210 and 271 and to be parallel to each other when no electric field is applied. Here, alignment of the liquid crystals is determined by rubbing direction and characteristics of alignment layers 11 and 12 formed on the transparent electrodes 241 and the common electrode 273. In the ECB mode, the rubbing direction of the two alignment layers 11 and 12 may be the same or opposite.

Figure 3:
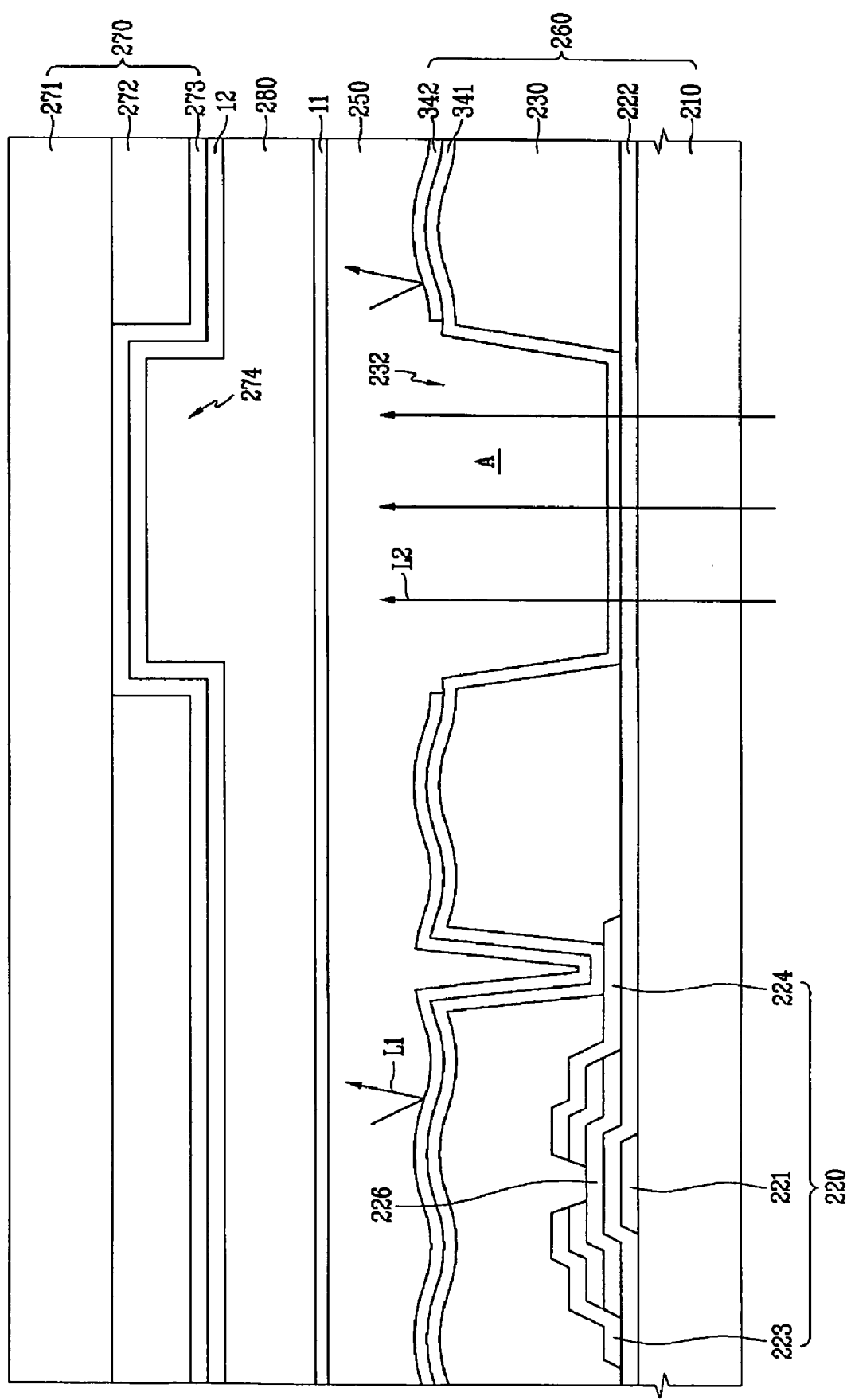
FIG. 3 is a sectional view of a transflective LCD according to another embodiment of the present invention.

FIG. 3 is a sectional view of a transflective LCD according to another embodiment of the present invention.

Referring to FIG. 3, when the LCD of FIG. 3 is compared with the LCD of FIG. 2, a distinguishing feature of the LCD of FIG. 3 is that transparent electrodes 341 are disposed between a light transmissive layer 230 and reflective electrodes 342. The transparent electrodes 341 are formed on the light transmissive layer 230 to have an approximately uniform thickness. Accordingly, the transparent electrodes 341 have embossed surfaces due to reflection of embossed surface of the light transmissive layer 230 and are electrically connected to drain electrodes 224 through contact holes 231.

As shown in FIG. 3, the contact area between the two electrodes 341 and 342 is wide. Accordingly, the two electrodes 341 and 342 are required to be formed of metals that scarcely react in order to reduce the galvanic effect.

A first alignment layer 11 is formed on the color filters 250 and a second alignment layer 12 is formed on the common electrode 273. The first and second alignment layers 11 and 12 are formed to align liquid crystals of the liquid crystal layer 280.

Figure 4:
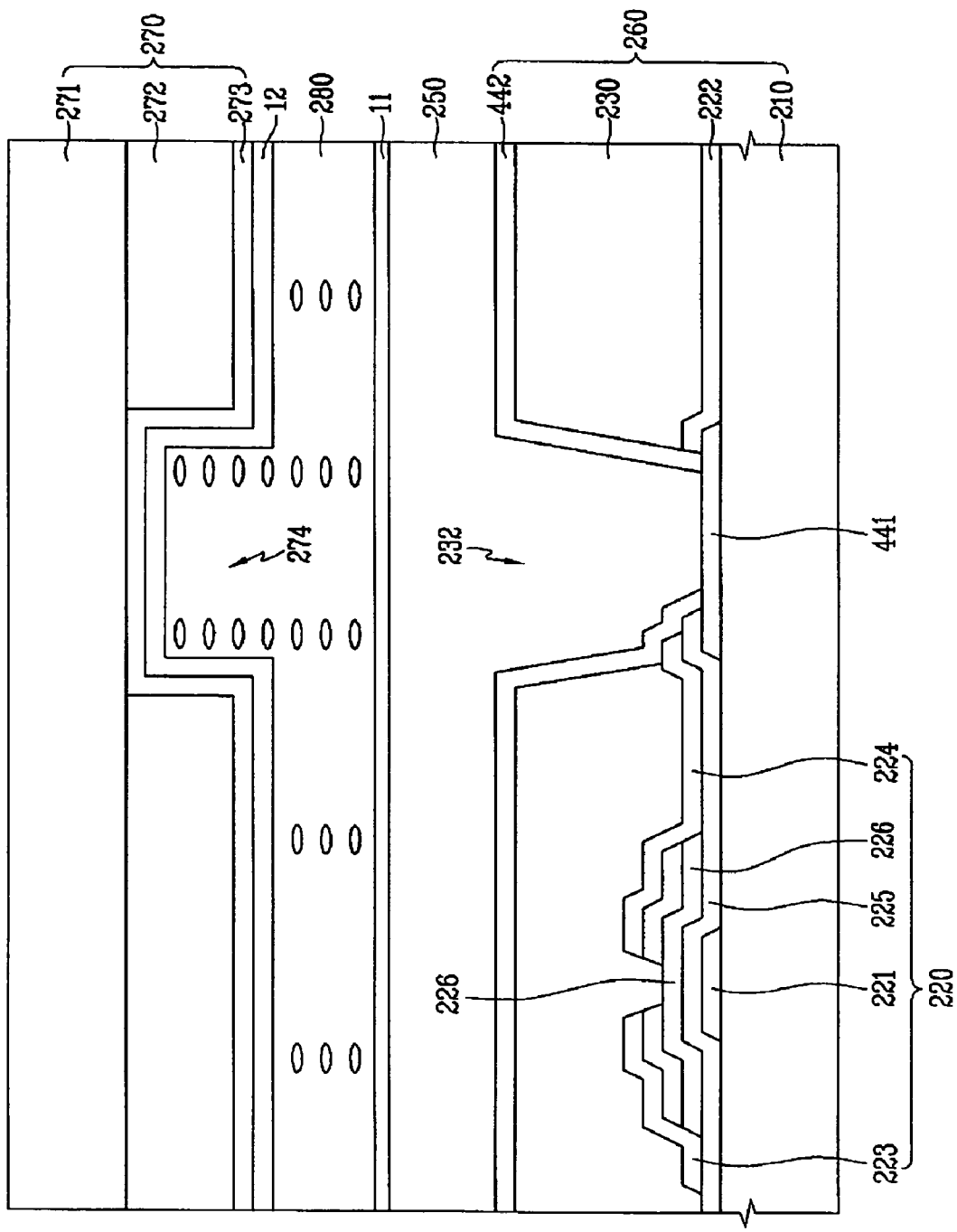
FIG. 4 is a sectional view of a transflective LCD according to another embodiment of the present invention.

FIG. 4 is a sectional view of a transflective LCD according to another embodiment of the present invention.

Referring to FIG. 4, transparent electrodes 441 are formed on an insulating substrate 210 on the same layer of gate electrodes 221. Transmission windows 232 are disposed on the transparent electrodes 441. A gate insulating layer 225 has openings to expose the transparent electrodes 441. Instead of forming contact holes for connecting drain electrodes 224 and reflective electrodes 442, the drain electrodes 224 are extended to be exposed through the transmission windows 232 and the reflective electrodes 442 are formed on the sidewall of the transmission window 232 and on the transparent electrodes 441 as well as on the light transmissive layer 230 to be electrically connected with the drain electrodes 224 and the transparent electrodes 441.

A first alignment layer 11 is formed on the color filters 250, and a second alignment layer 12 is formed on the common electrode 273. The first and second alignment layers 11 and 12 are formed to align liquid crystals of the liquid crystal layer 280.

Henceforth, a manufacturing method of a TFT array panel 560 according to an embodiment of the present invention will be described with reference to FIGS. 5A to 5F.

FIGS. 5A to 5F are sectional views of the TFT array panel for the transflective LCD shown in FIG. 2 in intermediate steps of manufacturing the TFT array panel.

Figure 5A:
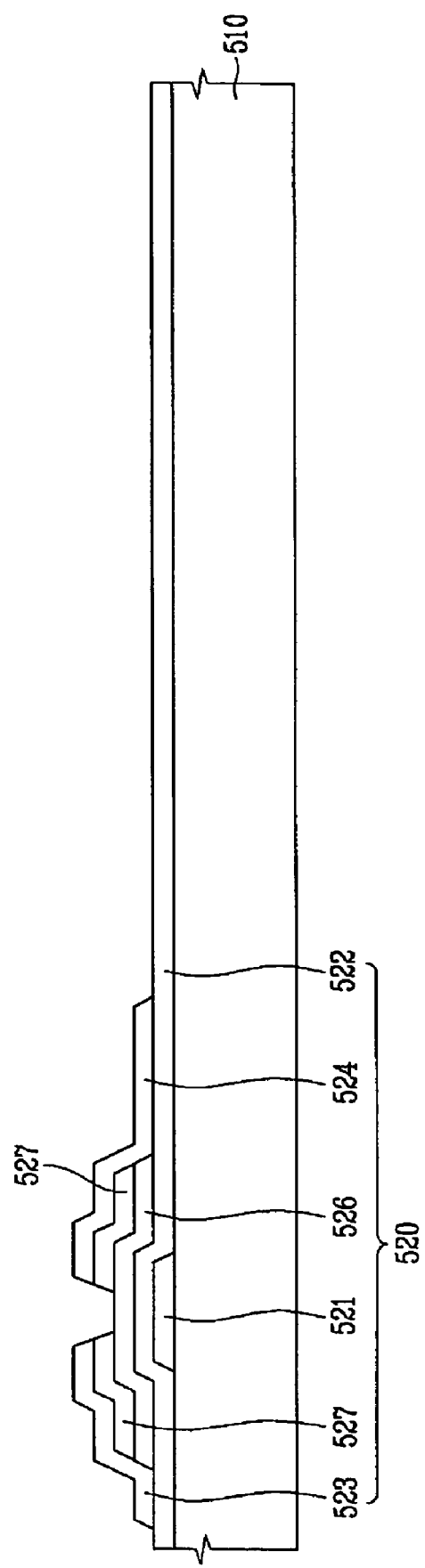

Referring to FIG. 5A, TFTs 520 respectively having a gate electrode 521, a source electrode 523, and a drain electrode 524 are formed on a first insulating substrate 510.

In detail, a metal layer (not illustrated) made of such as Al, Cr, or MoW is deposited on the insulating substrate 510 and is patterned to form the gate electrodes 521.

A gate insulating layer 522 made of silicon nitride or silicon oxide is deposited on the gate electrodes 521 and the first insulating substrate 510.

Next, an intrinsic amorphous silicon layer and an extrinsic amorphous silicon layer heavily doped with an N-type dopant are sequentially deposited on the gate insulating layer 522 by such as plasma enhanced chemical vapor deposition (PECVD) as an in situ process. Then, the intrinsic amorphous silicon layer and the extrinsic amorphous silicon layer are patterned to form semiconductors 526 and pre-patterns of ohmic contacts 527 disposed on the gate electrodes 521. At this time, the semiconductors 526 may be illuminated with a laser to crystallize the amorphous silicon, thereby turning the semiconductors 526 into polysilicon.

Next, source electrodes 523 and drain electrodes 524 are formed on the pre-patterns of the ohmic contacts 527 and the gate insulating layer 522.

Then, exposed portions of the pre-patterns of the ohmic contacts 527 are etched to form the ohmic contacts 527, and hereby TFTs 520 are formed on the first insulating substrate 510.

Figure 5B:
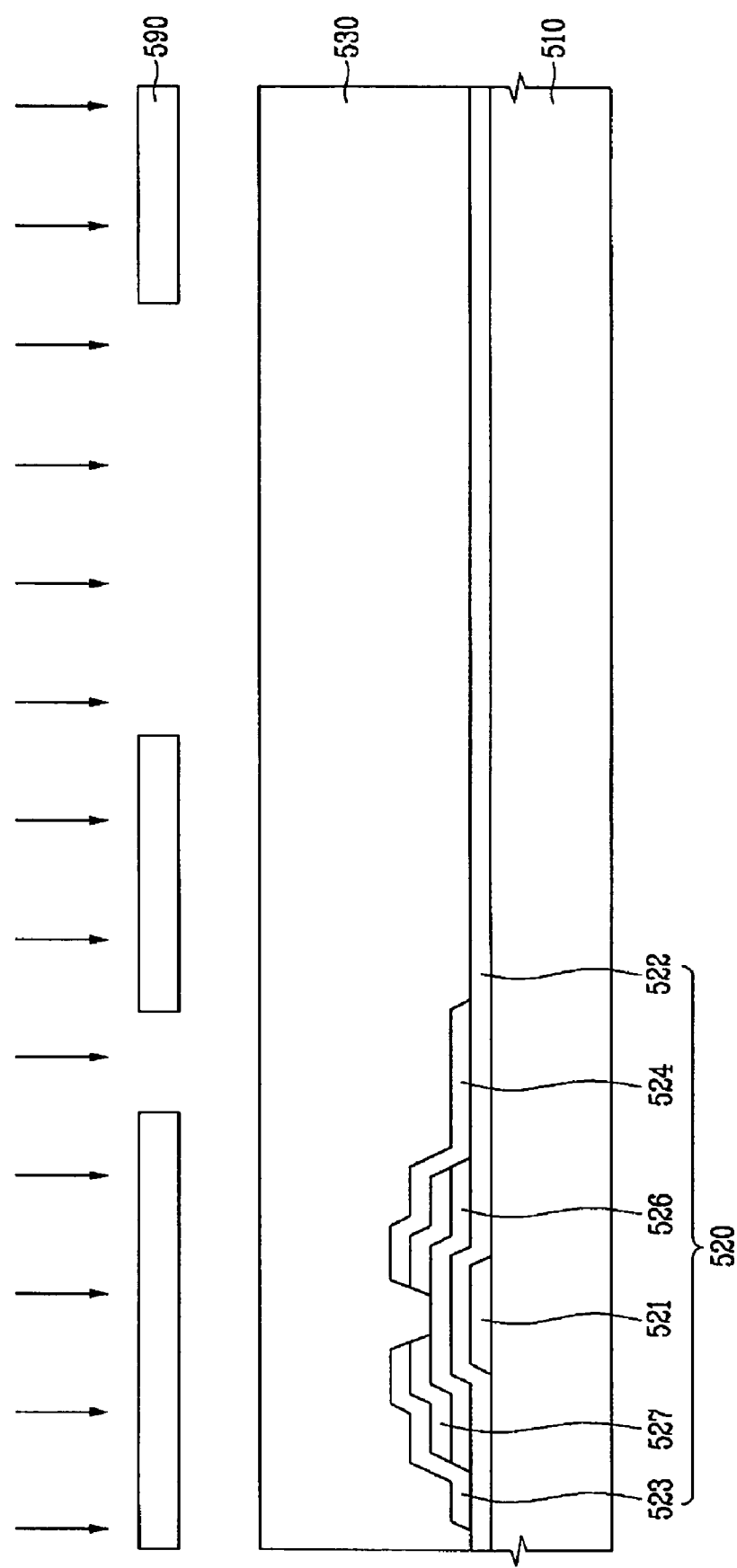

Referring to FIG. 5B, a photo sensitive light transmissive layer 530 is coated on the first insulating substrate 510 on which the TFTs 520 are formed. Next, after disposition of a first pattern mask 590 having a predetermined pattern on the light transmissive layer 530, the light transmissive layer 530 is exposed to a light.

Referring to FIG. 5C, the light-exposed light transmissive layer 530 is developed to form contact holes 531', transmission windows 532, and embossed surface. The contact holes 531' expose the drain electrodes 524 of the TFT 520s, and the transmission window 532 expose portions of the gate insulating layer 522. To form an embossed structure at the surface of the light transmissive layer 530, the first pattern mask may have a slit pattern (not illustrated).

Figure 5D:
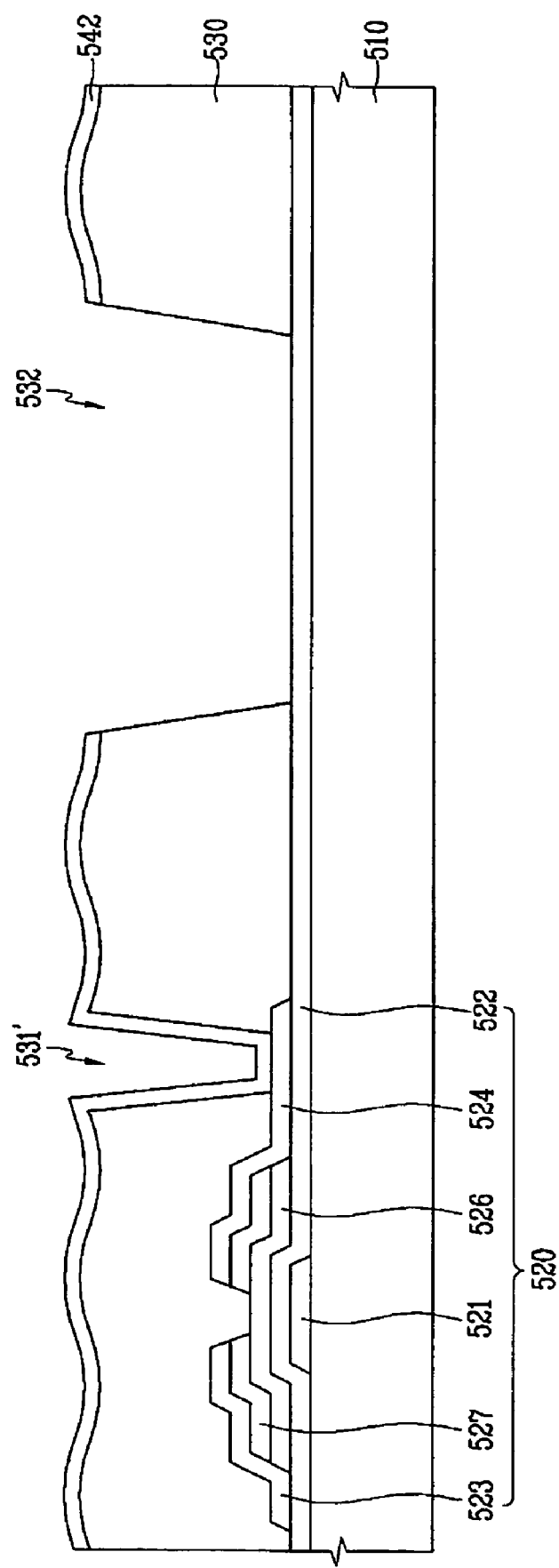

Referring to FIG. 5D, reflective electrodes 542 are formed on the light transmissive layer 530 to have openings corresponding to the transmission windows 532. The reflective electrodes 542 are electrically connected to the drain electrodes 524 through the contact holes 531'.

Figure 5E:
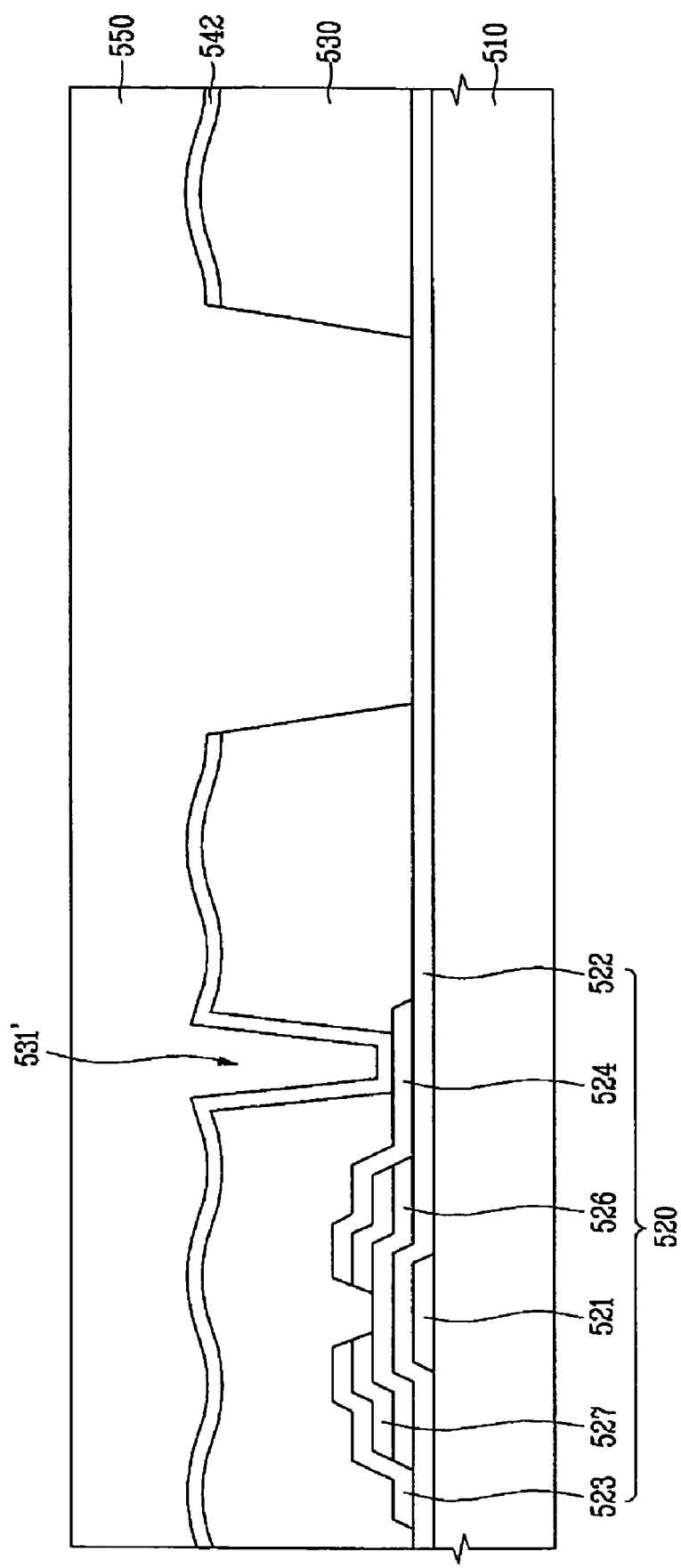

Next, referring to FIG. 5E, color filters 550 are formed on the reflective electrodes 542 to fill the transmission windows 532. The color filters 550 may include red, green, and blue filters, and the color filters 550 may have different thicknesses according to their color. The color filters 550 are formed to have a substantially flat top surface, and have contact holes 531 corresponding to the contact holes 531' of the light transmissive layer 530 to expose the drain electrodes 524.

Figure 5F:
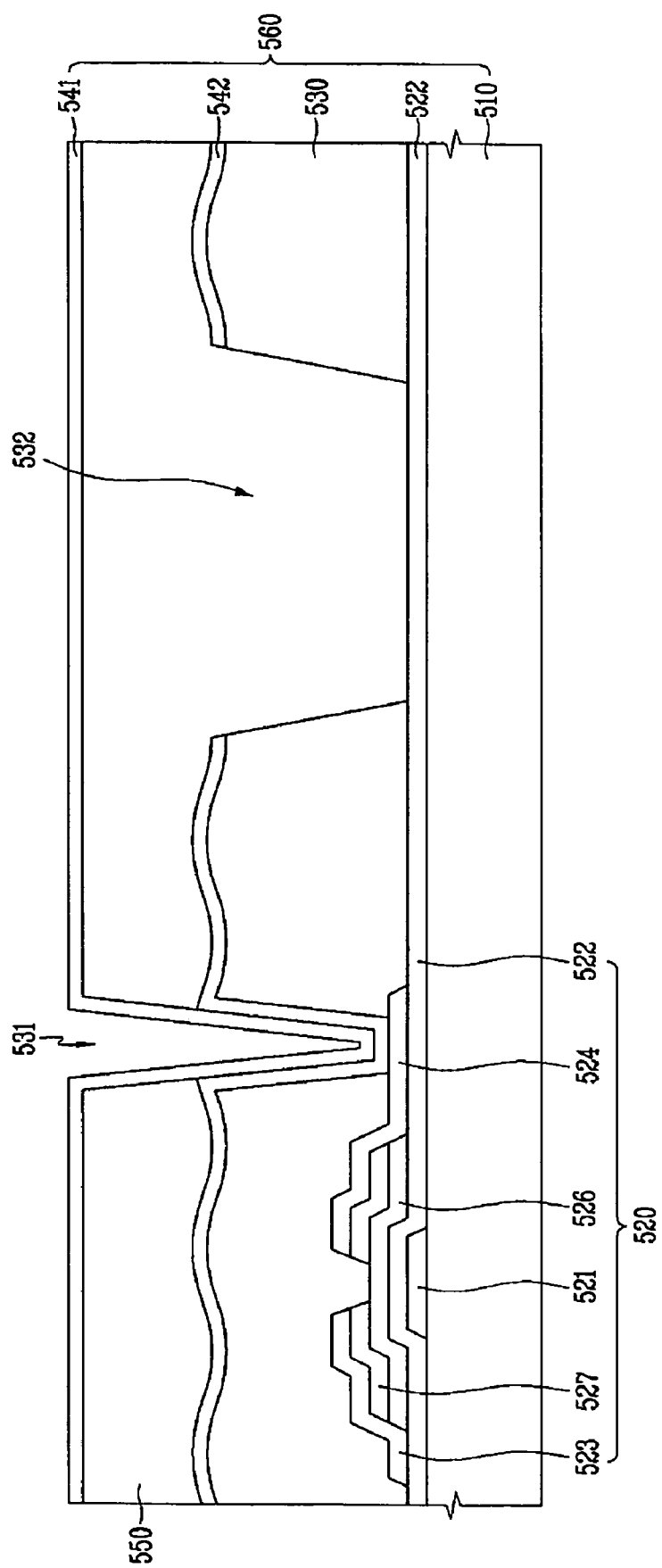

Next, referring to FIG. 5F, transparent electrodes 541 are formed on the color filters 550. The transparent electrodes 541 are formed to have a substantially uniform thickness, and are connected to the drain electrodes 524 and the reflective electrodes 542 through the contact holes 531.

A manufacturing method of a common electrode panel according to an embodiment of the present invention will be described with reference to FIGS. 6A to 6D.

FIGS. 6A to 6D are sectional views of a common electrode panel for the transflective LCD according to an embodiment of the present invention in intermediate steps of manufacturing the common electrode panel.

Figure 6A:
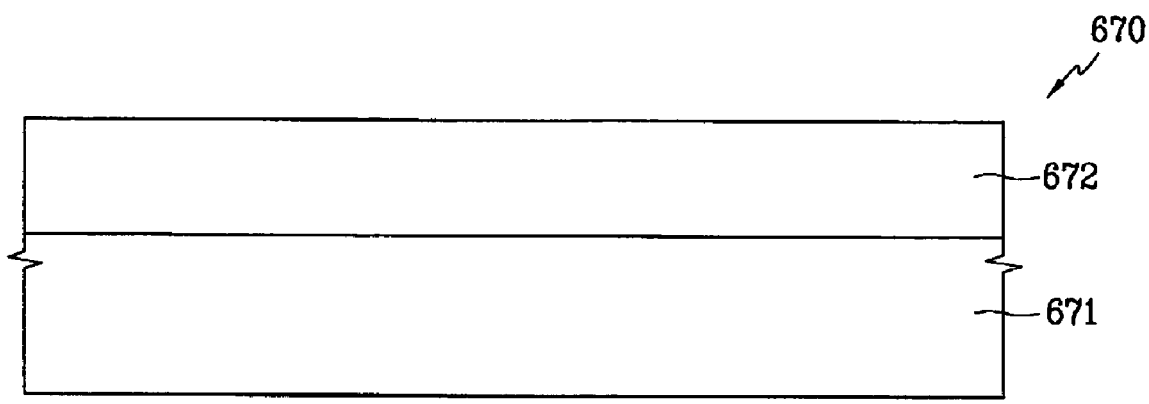
FIGS. 6A to 6D are sectional views of a common electrode panel for the transflective LCD according to an embodiment of the present invention in intermediate steps of manufacturing the common electrode panel.

Referring to FIG. 6A, an overcoating layer 672 of photosensitive material is coated on an insulating substrate 671 by a method such as spin coating.

Figure 6B:
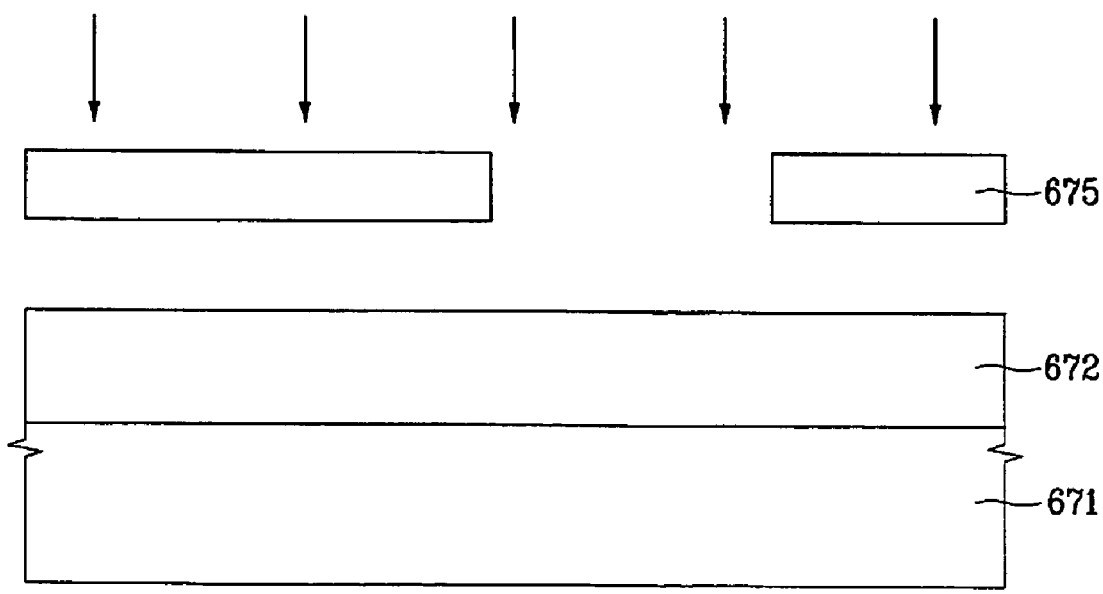

Next, referring to FIG. 6B, a second pattern mask 675 having a photo pattern to remove the overcoating layer 672 at portions corresponding to the transmission window 532 of the TFT array panel 560 is disposed on the overcoating layer 672 and is exposed to light.

Figure 6C:
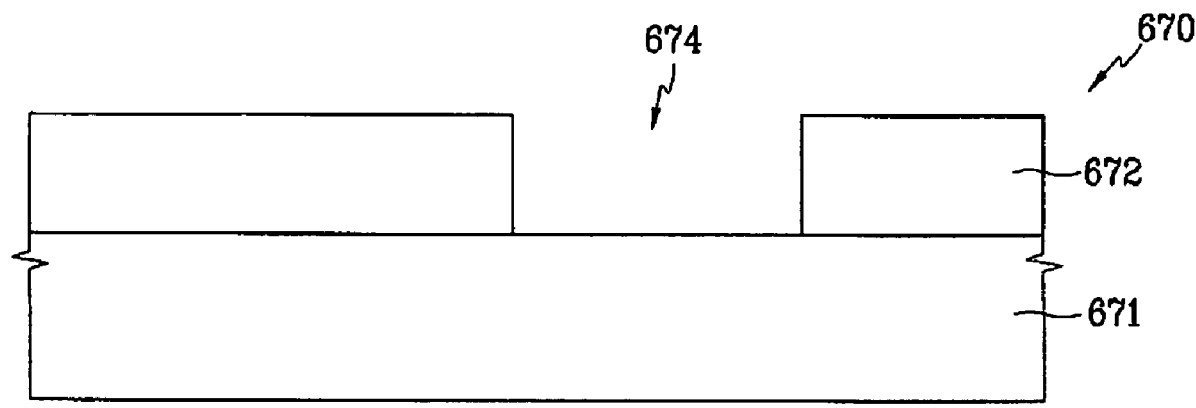

Then, referring to FIG. 6C, the light-exposed overcoating layer 672 is developed to form recessed portions 674.

Figure 6D:
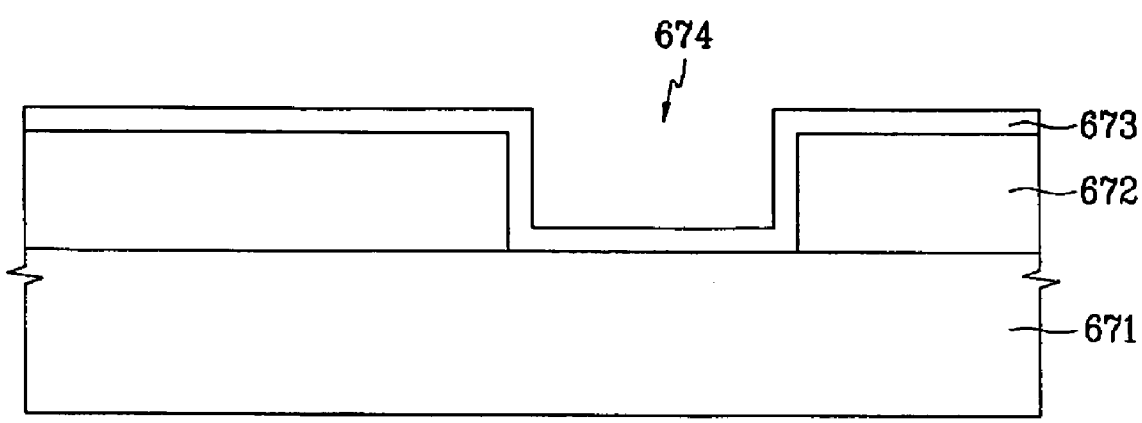

Referring to FIG. 6D, a common electrode 673 made of a light transmissive material is formed on the overcoating layer 673 having the recessed portions 674. Thereby a common electrode panel 670 is completely manufactured.

In embodiments of the present invention, color filters are formed to have different thicknesses between the reflection regions and the transmission regions. Accordingly, a difference in color reproduction between the transmission regions and the reflection regions is eliminated.

In embodiments of the present invention, cell gap of the transmission regions is formed to be twice as large as that of the reflection regions. Accordingly, a difference of optical characteristics between the reflection mode and the transmission mode is reduced.

Another embodiment of the present invention will now be described hereinafter with reference to the accompanying drawings.

Figure 7:
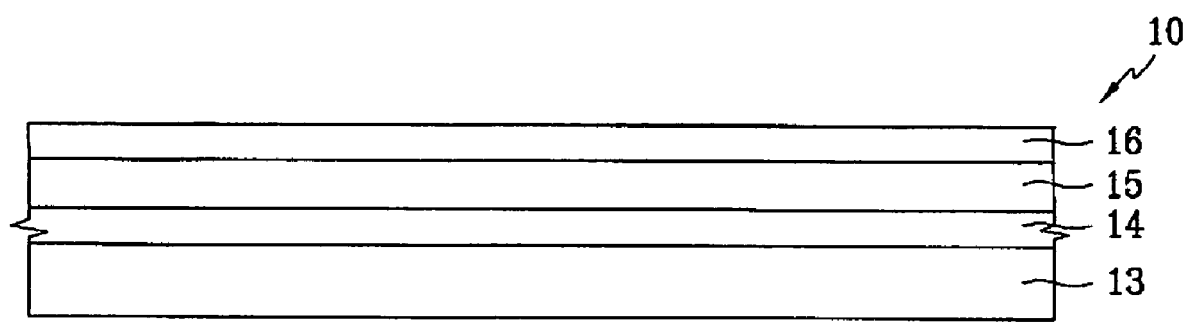
FIG. 7 is a sectional view of a color filter transfer film which is used for manufacturing a thin film transistor array panel of a transflective LCD according to an embodiment of the present invention.

FIG. 7 is a sectional view of a color filter transfer film which is used for manufacturing a thin film transistor array panel of a transflective LCD according to an embodiment of the present invention.

A color filter transfer film 10 comprises a base film 13 playing the role of a supporter, a cushion layer 14 uniformly dispersing roller pressure when a transfer is performed, a color filter layer 15 to be a color filter by transfer, and a cover film 16 for protecting the color filter layer 15.

An oxygen intercepting layer (not shown) may be further comprised between the color filter layer 15 and the cushion layer 14 to increase strength of the color filter layer 15 by intercepting oxygen coming from exterior. The oxygen intercepting layer enhances smoothness of layer surface.

Since thickness of the color filter layer 15 of the color filter transfer film 10 is easily controlled, the color filter transfer film 10 is useful to form color filters having various thicknesses.

A forming method of color filters using the color filter transfer film 10 will be described with reference to FIG. 8.

Figure 8:
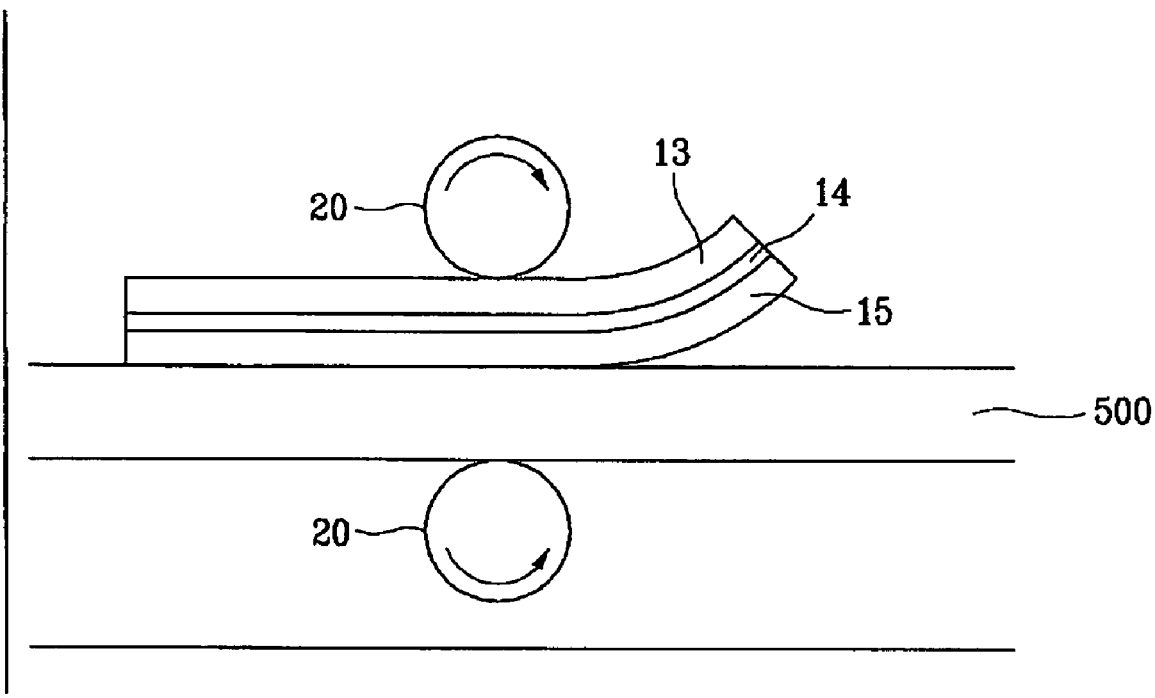
FIG. 8 is a schematic view of color filter forming process by using the color filter transfer film of FIG. 7.

FIG. 8 is a schematic view of color filter forming process by using the color filter transfer film of FIG. 7.

Referring to FIG. 8, after removing the cover film 16, the color filter transfer film 10 is disposed on a subject substrate 500 to have the color filter layer 15 contact the top surface of the subject substrate 500, where a predetermined thin film pattern is formed.

Next, the color filter transfer film 10 is pressed by a roller 20 to attach the color filter layer 15 to the subject substrate 500. At this time, the subject substrate 500 is heated to a temperature of 100~110° C. and the roller 20 is heated to a temperature of 120~140° C.

When the roller 20 presses the color filter transfer film 10, the cushion layer 14 is liquefied by heat and uniformly distributes the roller 20 pressure. Due to distribution of pressure by the cushion layer 14, transferred color filter layer 15 has a substantially flat top surface regardless of unevenness of the top surface of the subject substrate 500.

Next, after removing the base film 13 and the cushion layer 14, the transferred color filter layer 15 is exposed to a light through a predetermined mask and is developed to form color filter having predetermined shapes.

A manufacturing method of a TFT array panel 260 of FIG. 2 according to another embodiment of the present invention will be described with reference to drawings.

FIGS. 9A and 9B are sectional views of a TFT array panel for the transflective LCD according to another embodiment of the present invention in intermediate steps of manufacturing the TFT array panel.

Processes to form TFTs 520, a light transmissive layer 530 and reflective electrode 542 are the same as the processes illustrated in FIGS. 5A to 5D.

Next, a first color filter layer of a first transfer film is transferred on the reflective electrode 542 and is illuminated and developed to form a color filter layer 550a for the transmission regions, which fills the transmission window 532.

Next, a second color filter layer of a second transfer film is transferred on the reflective electrode 542 and is illuminated and developed to form a color filter layer 550b of the reflection regions, which fills the transmission window 532.

The color filter layers 550a and 550b are formed to have a substantially flat top surface, and have contact holes 531 corresponding to the contact holes 531' of the light transmissive layer 530 to expose the drain electrodes 524. Here the color filter layer of the first transfer film is twice thicker than that of the second transfer film.

In the present embodiment, the color filter layer 550a for the transmission region is formed with the first transfer film and the color filter layer 550b for the reflection region is formed with the first transfer film. Differently from the present embodiment, a partial thickness (for example, thickness to fill the transmission window 532) of the color filter layer 550a for the transmission region may be formed with a first transfer film and the remaining thickness of the color filter layer 550a for the transmission region and the color filter layer 550b for the reflection region may be formed with a second transfer film.

Red, green and blue color filters are formed by repeating the above described color filter forming processes.

As described above, when the color filter transfer film is used, a color filter having two different thickness is easily formed. Accordingly, processing time for forming color filters is reduced to enhance productivity. Further, since a dispersion liquid is not required to use, pollution of environment is reduced.

Henceforth, manufacturing methods of the TFT array panels for the transflective LCD shown in FIGS. 3 and 4 will be described.

At first, the TFT array panel shown in FIG. 3 is manufactured by a method that has a different feature in that the transparent electrode 341 is formed on the light transmissive layer 230 before forming the reflective electrode 342 from the method illustrated in FIGS. 5A to 5F.

FIG. 4 is a sectional view of a transflective LCD according to another embodiment of the present invention;

In detail, a metal layer (not illustrated) made of such as Al, Cr, or MoW is deposited on the insulating substrate 210 and is patterned to form the gate electrodes 221. A transparent conductive layer such as ITO and IZO is deposited on the insulating substrate 210 and is patterned to form the transparent electrodes 441.

Next, a gate insulating layer 225 made of silicon nitride or silicon oxide is deposited on the gate electrodes 221 and the transparent electrodes 441.

Next, an intrinsic amorphous silicon layer and an extrinsic amorphous silicon layer heavily doped with an N-type dopant are sequentially deposited on the gate insulating layer 225 by such as plasma enhanced chemical vapor deposition (PECVD) as an in situ process. Then, the intrinsic amorphous silicon layer and the extrinsic amorphous silicon layer are patterned to form semiconductors 226 and pre-patterns of ohmic contacts 227 disposed on the gate electrodes 221. At this time, the semiconductors 226 may be illuminated with a laser to crystallize the amorphous silicon, thereby turning the semiconductors 226 into polysilicon.

Next, source electrodes 223 and drain electrodes 224 are formed on the pre-patterns of the ohmic contacts 227 and the gate insulating layer 225.

Then, exposed portions of the pre-patterns of the ohmic contacts 227 are etched to form the ohmic contacts 227, and hereby TFTs 220 are formed on the first insulating substrate 210.

Next, a photo sensitive light transmissive layer 230 is coated on the first insulating substrate 210 on which the TFTs 220 are formed. Next, after disposition of a pattern mask having a predetermined pattern on the light transmissive layer 230, the light transmissive layer 230 is exposed to a light.

Referring to FIG. 4, the light-exposed light transmissive layer 230 is developed to form the light transmissive layer 230 having a predetermined pattern. In detail, the light transmissive layer 230 has transmission windows 232 exposing the transparent electrodes 441. The transmission windows 232 also expose the drain electrodes 224 of the thin film transistor.

Next, reflective electrodes 242 are formed on the light transmissive layer 230 to have openings corresponding to the transmission windows 232. The reflective electrodes 242 are extended to the bottom of the transmission windows 232 to be electrically connected to the drain electrodes 524 and the transparent electrodes 441 through the transmission windows 232.

Next, color filter layers are coated on the reflective electrodes 242 and the transparent electrodes 441 and patterned to form color filters 250. Here, color filter transfer films may be used to form the color filters 250.

Although preferred embodiments of the present invention have been described in detail hereinabove, it should be clearly understood that many variations and/or modifications of the basic inventive concepts herein taught, which may appear to those skilled in the present art, will still fall within the spirit and scope of the present invention, as defined in the appended claims.

What is claimed is:

1. A transflective liquid crystal display having reflection regions and transmission regions, and comprising:
a first substrate;
a light transmissive layer disposed on the first substrate and including recessed portions corresponding to the transmission regions;

color filters disposed on the light transmissive layer and including a position-dependent thickness due to the recessed portions of the light transmissive layer;

transparent electrodes disposed on the first substrate;

reflective electrodes electrically connected to the transparent electrodes and interposed between the light transmissive layer and the color filters;

a second substrate;

a common electrode disposed on the second substrate; and a liquid crystal layer interposed between the first substrate and the second substrate.

2. The transflective liquid crystal display of claim 1, further comprising:

TFTs having gate electrodes formed on the first substrate, semiconductors formed on or under the gate electrodes and insulated from the gate electrodes, source and drain electrodes connected to the semiconductors; and wherein pixel electrodes are composed of the transparent electrodes and the reflective electrodes, which are connected to the drain electrodes.

3. The transflective liquid crystal display of claim 2, further comprising an insulating layer interposed between the second substrate and the common electrode and having recessed portions facing the recessed portions of the light transmissive layer.

4. The transflective liquid crystal display of claim 3, wherein the recessed portions of the light transmissive layer have a depth substantially the same as the thickness of the color filter on the reflection regions.

5. The transflective liquid crystal display of claim 1, wherein the thickness of the light transmissive layer at the recessed portions is zero.

6. The transflective liquid crystal display of claim 1, wherein the light transmissive layer has an embossed surface and the reflective electrodes have an embossed structure due to the embossed surface of the light transmissive layer.

7. The transflective liquid crystal display of claim 6, wherein the transparent electrodes are disposed on the color filters.

8. The transflective liquid crystal display of claim 6, further comprising an insulating layer interposed between the second substrate and the common electrode and having recessed portions facing the recessed portions of the light transmissive layer.

9. The transflective liquid crystal display of claim 8, wherein the recessed portions of the light transmissive layer have a depth substantially the same as the thickness of the color filter on the reflection regions.

10. The transflective liquid crystal display of claim 1, wherein the color filters have a substantially flat top surface.

11. The transflective liquid crystal display of claim 1, wherein the thickness of the color filters on the transmission region is twice that on the reflection regions.

12. The transflective liquid crystal display of claim 11, wherein the transparent electrodes are disposed on the color filters.

13. The transflective liquid crystal display of claim 11, further comprising an insulating layer interposed between the second substrate and the common electrode and having recessed portions facing the recessed portions of the light transmissive layer.

14. The transflective liquid crystal display of claim 13, wherein the recessed portions of the light transmissive layer have a depth substantially the same as the thickness of the color filter on the reflection regions.

15. The transflective liquid crystal display of claim 1, wherein the transparent electrodes is disposed on the color filters.

16. The transflective liquid crystal display of claim 15, further comprising an insulating layer interposed between the second substrate and the common electrode and having recessed portions facing the recessed portions of the light transmissive layer.

17. The transflective liquid crystal display of claim 16, wherein the recessed portions of the light transmissive layer have a depth substantially the same as the thickness of the color filter on the reflection regions.

18. The transflective liquid crystal display of claim 1, wherein the liquid crystal layer has liquid crystals aligned in parallel to the first and second substrates and in a same direction when no electric field is applied.

19. The transflective liquid crystal display of claim 1, further comprising:

a first alignment layer formed on the color filters; and a second alignment layer formed on the common electrode, wherein the rubbing direction of the first alignment layer is parallel with that of the second alignment layer.

20. The transflective liquid crystal display of claim 1, wherein the liquid crystal layer has liquid crystals aligned vertical to the first and second substrates when no electric field is applied.

* * * * *